United States Patent [19]

Czarnetzki et al.

[11] Patent Number: 5,665,402
[45] Date of Patent: Sep. 9, 1997

[54] EXTRUSION MACHINE

[75] Inventors: Robert Czarnetzki, Deggendorf; Wolfram Lihotzky-Vaupel, Niederalteich, both of Germany

[73] Assignee: Emil Lihotzky Maschinenfabrik, Plattling, Germany

[21] Appl. No.: 494,058

[22] Filed: Jun. 23, 1995

[30] Foreign Application Priority Data

Jun. 24, 1994 [DE] Germany .................. 44 22 248.3

[51] Int. Cl.$^6$ ................................. B29C 47/08
[52] U.S. Cl. ................. 425/183; 425/185; 425/190; 425/196
[58] Field of Search .................. 425/183, 184, 425/185, 188, 190, 197, 198, 199, 196

[56] References Cited

U.S. PATENT DOCUMENTS

| | | | |
|---|---|---|---|
| 2,905,109 | 10/1959 | Schrenk | 425/72.1 |
| 4,395,212 | 7/1983 | Lambertus | 425/185 |
| 4,465,451 | 8/1984 | Adderley, Jr. | 425/145 |
| 4,728,279 | 3/1988 | Bellmer | 425/185 |
| 4,880,374 | 11/1989 | Hamamura et al. | 425/185 |
| 5,286,323 | 2/1994 | Bagley | 425/380 |
| 5,448,458 | 9/1995 | Glaser et al. | 425/197 |

*Primary Examiner*—Jay H. Woo
*Assistant Examiner*—Iurie A. Schwartz
*Attorney, Agent, or Firm*—Larson and Taylor

[57] ABSTRACT

Extrusion machine having a machine frame, an extrusion press and a material inlet opening and a material outlet opening, a drive for the extrusion press and a die located in the vicinity of the material outlet opening and a cutting tool associated with the die. A changer mechanism is provided, which has a support member for at least two replaceable dies and/or cutting tools and the support member is arranged in movable manner relative to the extrusion press in the vicinity of the material outlet opening. The support member has a circular arc-shaped configuration and is pivotably mounted. The pivot pin of the support member is displaced with respect to the material outlet opening plane and is substantially perpendicular to the material discharge direction.

12 Claims, 2 Drawing Sheets

EXTRUSION MACHINE

BACKGROUND OF THE INVENTION

The invention relates to an extrusion machine having a machine frame, an extrusion press, a material inlet opening and a material outlet opening, from which a material flow passes in one direction, a drive for the extrusion press and a die located in the vicinity of the material outlet opening, together with a cutting tool associated with said die, a changer mechanism being provided, which has a support member for at least two interchangeable dies and/or cutting tools, and the support member is movably positioned with respect to the extrusion press in the vicinity of the material outlet opening.

When operating the extrusion press it is necessary at certain time intervals to replace the die and/or cutting tool. In the case of extrusion machines with a die and cutting tool fitted in stationary manner it is firstly necessary to stop the extrusion press, so that the production process is interrupted. Following the replacement of the die or cutting tool production must be restarted. However, said starting process yields a certain production waste until the production process has been set up again in such a way that the desired quality is obtained.

For extruding detergents there are e.g. production processes in which initially dry substances are weighed out and then transported over several floors to a mixer, where different liquids are added to the pulverulent substances. The mixture is then supplied to the extruder. If, as a result of a change of a die or a cutting tool on the extruder, said production process has to be interrupted, a charge of dry product remains in the mixer. On restarting the production installation this dry product must firstly be discharged upstream of the extruder, because otherwise it would lead to a blocking of the extruder screw. Therefore firstly the mixing process must be started up to such an extent that the mixer supplies a desired, extrudable preliminary product. Until the mixture delivered by the mixer is sufficiently plastic, several hundred kg of material is discharged upstream of the extruder. Hitherto the checking of the mixture delivered by the mixer has taken place in a manual manner and is both time and labour-consuming. If this work prior to the restarting of the extrusion machine is not performed in a conscientious manner, it is necessary to clean the extruder in all the production-carrying members.

A replacement of a die or a cutting tool in such an extrusion machine consequently not only leads to a loss of production during the changing work, but also to a significant production loss on restarting the extrusion machine.

In a known extrusion machine this production loss is avoided in that the die and the cutting tool are automatically changed by a changer mechanism at the material outlet opening of the extrusion press. The change takes place in such a way that an interruption to the operation of the extrusion press is no longer necessary.

In the known extrusion machine the changer mechanism with the drive and the interchangeable tools are located at the material outlet opening of the extrusion press. This arrangement is particularly advantageous if sufficient space is available in the vicinity of the material outlet opening.

SUMMARY OF THE INVENTION

The object of the invention is to so further develop an extrusion machine of the aforementioned type that a change can be made even when there is a limited amount of space available at the material outlet opening.

According to the invention this object is achieved by an extrusion machine having a machine frame, an extrusion press, a material inlet opening and a material outlet opening, from which a material flow passes out in one direction, a drive for the extrusion press and a die located in the vicinity of the material outlet opening and a cutting tool associated with said die, a changer mechanism being provided, which has a support member for at least two replaceable dies and/or cutting tools, and the support member is movably arranged relative to the extrusion press in the vicinity of the material outlet opening, wherein the support member is constructed in circular arc-shaped manner and is pivotably mounted and the pivot pin of the support member is displaced relative to the plane of the material outlet opening and is substantially positioned perpendicular to the direction of said material flow at said material outlet opening.

The support member in the form of a curved plate has a predetermined, preferably constant radius of curvature. As a result of the circular arc-shaped construction of the support member the mounting and the drive of the support member can be moved out of the vicinity of the material outlet opening. Maintenance work on the dies and cutting tools of the support member not in operation can be performed in the lateral areas of the extrusion machine.

According to a further development of the extrusion machine according to the invention the support member is mounted on the extrusion press. As a result of the mounting on the machine frame of the extrusion press a particularly compact machine arrangement is obtained.

It is particularly advantageous to direct the pivot pin in a vertical or horizontal manner, the support member being pivotable thereabout in horizontal-circular or vertical-circular (i.e., in a horizontal or vertical plane, with a circular motion) manner. The support member can also be constructed as a closed arc, which is movable around the entire extrusion press. As a result of these arrangements the space laterally or above the extrusion press can be particularly well utilized.

According to another advantageous embodiment of the invention the support member is mounted by means of a frame in the central area of the extrusion press. With such a mounting a relatively large support member turning radius is achieved, so that the movement of the support member takes place directly at the material outlet opening substantially parallel to the plane of said opening, which permits a faster changing process.

In another advantageous embodiment it is advantageous to associate a material discharge shaft with the die. A specific, separate material discharge shaft is hereby associated with each die. Thus, on changing different dies it is ensured that there is not undesired mixing of two differently formed products in a material discharge shaft. It is in particular provided that a material discharge shaft is associated with each die.

According to a further advantageous development of the invention the material discharge shaft is arranged downwards at right angles to the material outlet opening and has the cutting off drive and/or cutting tool. This leads to a separation of the cutting mechanism and the die, which leads to a simplification, particularly in the case of maintenance work.

According to an advantageous embodiment of the invention the material discharge shaft is pivotably located on the support member. A material discharge shaft is fixed with respect to a die by means of an articulated connection on the support member. In the lateral rest position the material discharge shaft can be pivoted away from the die along the articulated connection, so that the material discharge shaft, die and cutting tool are more easily accessible for maintenance purposes.

In another advantageous embodiment of the invention the material discharge shaft can be plugged onto the support member. Thus, the material discharge shaft can be easily removed or replaced, which is especially desirable for maintenance work or during product changes.

According to an advantageous further development of the invention the support member drive is constituted by a motor with a gear arrangement or a double-acting cylinder arrangement. The motor is in particular constituted by an electric motor, which is operatively connected to the support member by means of a toothed gear or a cable winch. The double-acting cylinder can in particular be a pneumatic or hydraulic cylinder, which is directly connected to the support member.

According to the invention a further advantageous development is constituted by the fact that the support member has a chain, which is connected to the drive. The chain can be driven both by a motor and by a pressure cylinder. The support member can comprise a chain arrangement to which are fixed the dies and/or cutting tools.

In another embodiment of the invention it is advantageous that the support member has a cable, which is connected to the drive. Particularly in the case of a steel cable there is only a slight friction on the guide pulleys, so that relatively limited displacement forces are needed for pivoting the support member.

Another advantageous development of the invention consists of the support member having a slider swing mechanism, which is connected to the drive, which permits an efficient adjustment movement of the support member.

The changer mechanism makes it possible during the production process to rapidly and easily replace the die and/or cutting tool, because it is quickly possible to "switch" between two tools, the new tool being moved in front of the opening of the extrusion press, whereas the used tool is moved out of the opening of the extrusion press and is subsequently removed from the changer mechanism and can be overhauled or cleaned.

As a result of the invention there is no longer any need to stop the production process for changing a die or cutting tool and the resulting production waste no longer occurs. The extrusion machine and the upstream machines can operate continuously.

The support member of the changer mechanism can have either solely the cutting tools or solely the dies and then in each case the die or cutting tool is arranged in conventional, stationary manner with respect to the extrusion press. However, in a particularly preferred variant both the dies and the cutting tools are received by the support member, so that the changer mechanism can change both dies and cutting tools. This has the advantage that during each die change the operating personnel can simultaneously monitor and check the cutting tool and, if necessary, decide whether it does or does not have to be replaced. It is also possible to provide a support member for the dies on the one hand and the cutting tools on the other, the two support members being movable independently of one another.

It is also advantageous if the cutting tool is formed by a knife arrangement mounted in rotary manner positioned on the die side facing the extrusion press and which is subject to the action of a cutting drive. With such a rotary knife system the knives are in direct contact with the die or during their rotation are pressed onto the die. The speeds of the knife system can be between a few and several thousand revolutions per minute. For this purpose between the drive and the cutting tool a gear is provided, which is preferably steplessly variable, whilst the drive can also be steplessly variable. A particularly compact construction is ensured if in the drive line between the cutting drive and the cutting tool there is at least one shift gear. The drive is located on the cutting tool support member.

If there is at least one differential shaft in the drive line between the cutting drive and the cutting tool, only slight vibrations occur even at high cutting tool speeds.

Further advantageous developments of the invention can be understood with reference to the detailed description which follows.

BRIEF DESCRIPTION OF THE DRAWINGS

The invention is described in greater detail hereinafter relative to the drawings, wherein.

DESCRIPTION OF THE PREFERRED EMBODIMENT

Figure 1:
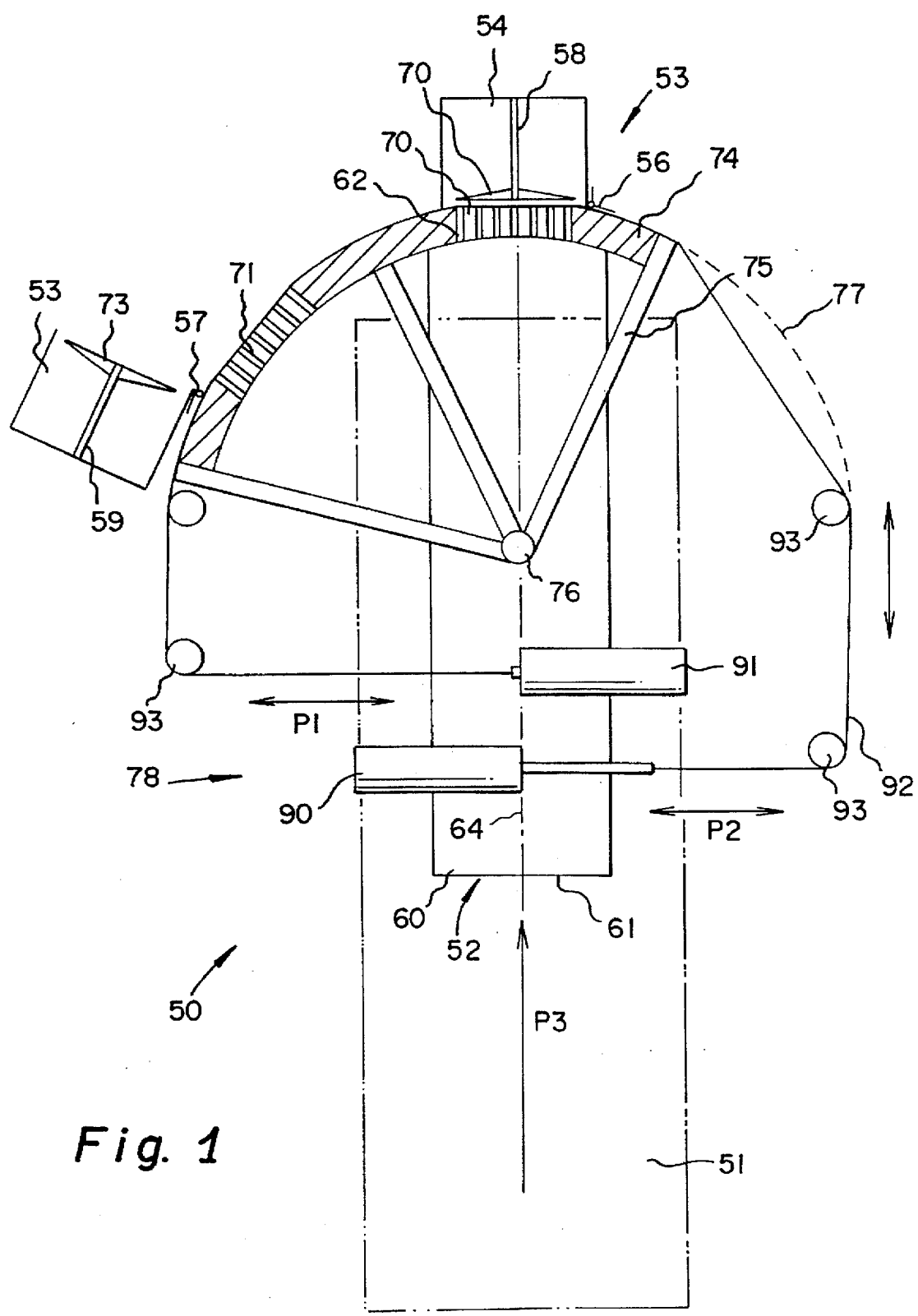
FIG. 1 a plan view of an extrusion machine according to the invention.

An extrusion machine 50 according to the invention has a machine frame 51 with an extrusion press 52. The extrusion press 52 has a cylindrical casing 60 with a material inlet opening 61 and a material outlet opening 62.

At the material outlet opening 62 there is provided a support member 74 in the form of a curved plate of a changer mechanism 53. The support member 74 is pivotably mounted on the cylindrical casing 60 by means of a changer frame 75. The pivot pin 76 is directed perpendicular to the longitudinal axis 64 of the cylindrical casing 60 in which the extrusion worm is located. The pivoting range 77 of the support member 74 there is represented by a broken line.

In the support member 74 are provided two dies 70,71. Each of the dies 70,71 has bores, which in the operating position are parallel to the material feed direction P3 and the material discharge direction. With each of the dies 70,71 is associated a cutting tool 72,73. By means of a cutting shaft 58,59 the particular cutting tool 72,73 is mounted in a material discharge shaft 54,55. The cutting shaft, 58,59 is in each case driven by means of a not shown drive at the material discharge shaft 54,55.

The material discharge shaft 54,55 is pivotably fixed by means of an articulated connection 56,57 to the support member 74. The material discharge shaft 54 is shown in the closed operating position. During operation a material is pressed in the material feed direction P3 by means of the extrusion press 52 through the die 70. The pressed, shaped material is cut to length downstream of the die 70 by the cutting tool 72 and is collected and carried away in the material discharge shaft.

The material discharge shaft 55 is in the rest position and is shown in the swung open position. In this position it is possible to perform maintenance and replacement work on the die 71 and the cutting tool 73.

The changer mechanism 53 is moved by means of a double-acting cylinder drive 78, so that either the die 70 or the die 71 is in the operating position. The circular arc-shaped support member 74 is connected by means of a chain 92 guided around guide pulleys 93 to two double-acting cylinders 90,91. The movement of the double-acting cylinders 90,91 is in each case represented by an arrow P1 and P2. The double-acting cylinders 90,91 are in matched manner controlled in such a way that there is a rotation of the support member 74 round the pivot pin 76 by means of the chain 92. The adjusting movement of the support member 74 between the two operating positions for the two cutting tools 70,71 takes place at a specific speed, which is so set that the operation of the extrusion press 52 need not be interrupted.

Figure 2:
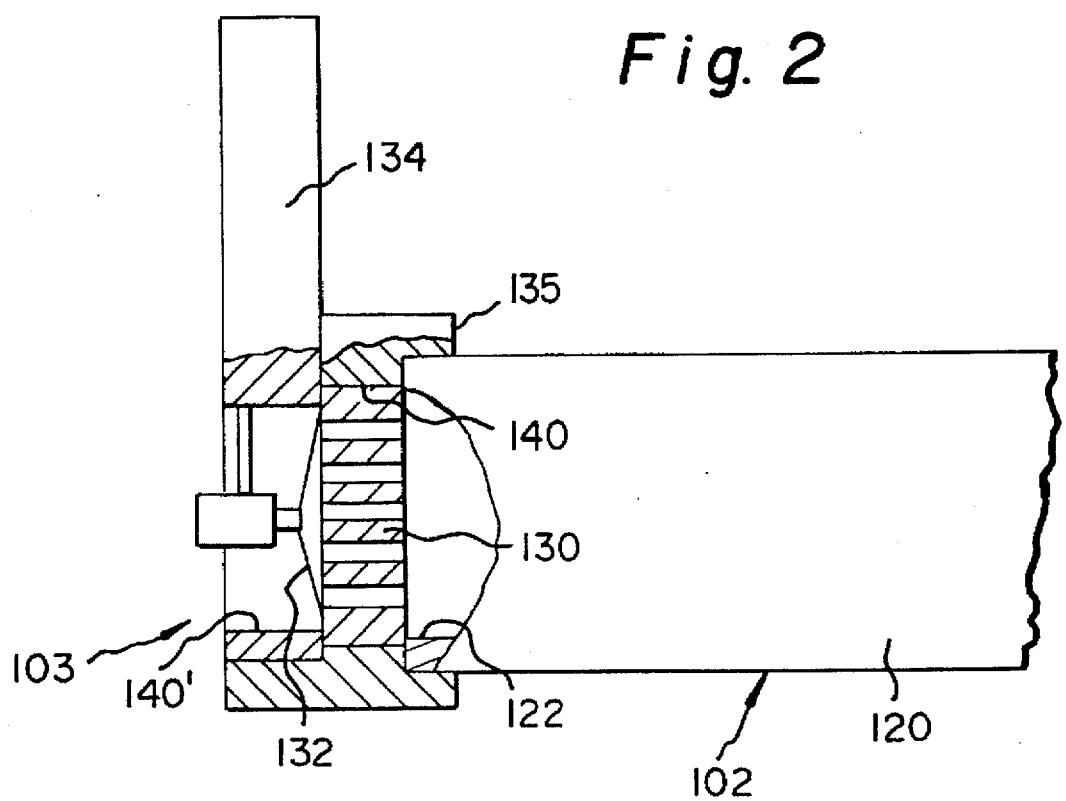
FIG. 2 a diagrammatic side view of an extrusion press with a stationary die and changeable cutting tool.

A variant to the hitherto described extrusion machine 103 is shown in FIG. 2. The extrusion press 102 is connected at the front end of its cylindrical casing 120 in the vicinity of the material outlet opening 122 to a changer casing 135. The changer casing 135 has a through bore 140, in which at the end facing the cylindrical casing 120 is inserted in stationary, but replaceable manner a die 130. On the side of the die 130 remote from the material outlet opening 122 is provided a rotary support member, which there is rotatable in the already described manner about its axis positioned perpendicular to the axis of the cylindrical casing 120. The support member 134 has a plurality of bores 140', whereof only one is shown in FIG. 2. In the described manner a cutting tool 132 is located in each of these bores 140'.

In the case of this extrusion machine by rotating or pivoting the support member 134 a new cutting tool can be positioned behind the die 130. Obviously it is also possible to use here other described support member versions.

Figure 3:
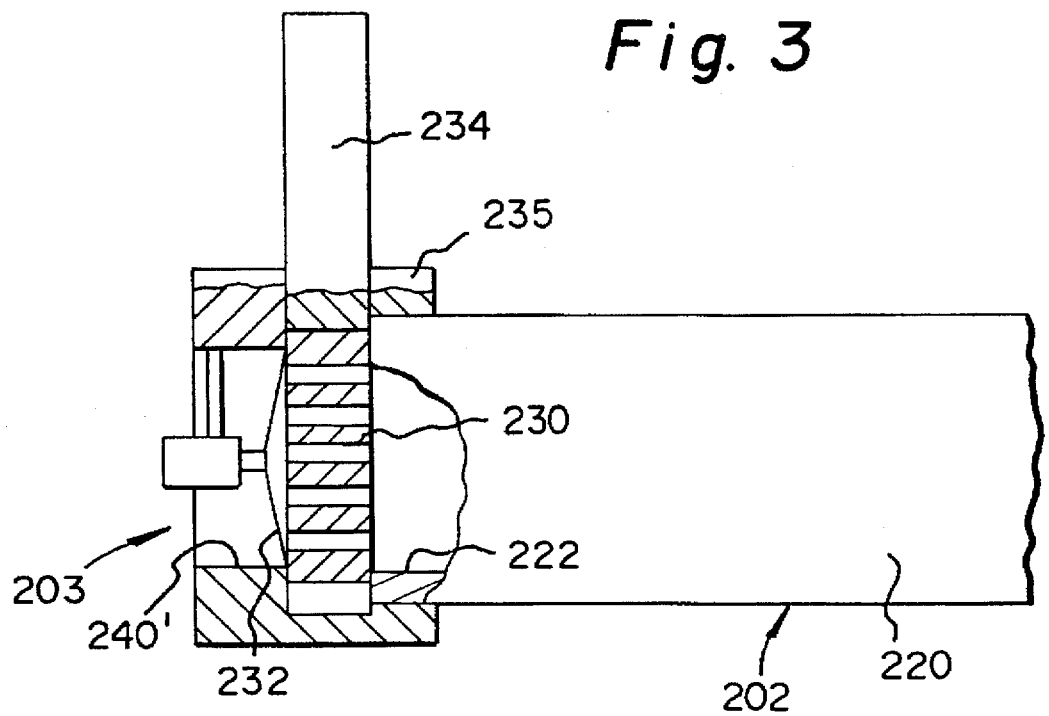
FIG. 3 a diagrammatic, part sectional side view of an extrusion machine with a stationary cutting tool and changeable die.

FIG. 3 shows an extrusion machine 203 similar to FIG. 2, but in which the cutting tool 232 is arranged in stationary manner in the bore 240' of the changer casing 235 behind the die 230. In the rear area of the changer casing 235, on the side of the cutting tool 232 facing the material outlet opening 222, there is provided a support member 234, which can be constructed in the same way as the hitherto described support members. In the support member 234 there is provided a plurality of dies 230, whereof only one is shown here. By rotating, pivoting or a translatory movement of the particular support member 234 changes can be made between the dies 230 located in the support member 234 and in each case a die 230 is moved in the bore 240' between the material outlet opening 222 and the cutting tool 232. The constructions of FIGS. 2 and 3 can also be combined, so that, as required, either the die or the cutting tool can be changed in a random manner.

The hitherto described embodiments of the extrusion machine according to the invention are based on a horizontal arrangement of the extrusion press and a vertical arrangement of the movement plane of the support member in the changer casing. However, the extrusion press could be vertically positioned and the movement axis of the support member in the changer casing can be horizontal and also angles between these extreme positions are possible.

The extrusion machine according to the present invention can be used for plastic and injection moulds, in that in place of insert dies e.g. on a horizontally projecting extruder there can be arranged a vertically fitted changer with injection moulds for the metal or plastic injection in such a way that said moulds can be used in rapid order. Thus, without further disadvantages, it is possible to extend the injection follow-up cycle time and increase the cooling time, whilst displacing the ejection of the injection moulded parts to a third station. The economics of the process are greatly improved by this. Into the changer system can be integrated heating surfaces or rotary connections with steam or which are electrically supplied via sliding contacts. It is also possible to provide cooling means, the rotary connections permitting the supply of special cooling media such as cold water or sols.

The changer mechanism can also be designed for random existing extruders or worm presses of any size or design.

During the changing process the extrusion working pressure can be reduced by suitable, known means and controls, but the working pressure can also be made flexible by design. A practical example for the cost saving achieved when using the extrusion machine according to the invention shows that for an hourly output of 6000 kg/h/extrusion press and for a price of DM 2/kg for the material processed in said press, there is a production loss of DM 12,000 for each hour during which the extruder is shutdown. If it is borne in mind that the machine must be switched off up to six times daily in order to change knives and which takes 30 minutes, then the invention saves several million DM of production wastage in a working year of 240 days.

What is claimed is:

1. An extrusion machine comprising:

a machine frame;

an extrusion press mounted to said frame and having a material inlet opening, a material outlet opening, a die located in front of said material outlet opening, a cutting tool associated with said die, and a replacement element for a predetermined displaceable one of said die and said cutting tool;

a drive means for driving material through said extrusion press and out of said material outlet opening along a central outlet axis;

a changer mechanism located adjacent said material outlet opening of said extrusion press which interchanges said displaceable one and said replacement element in front of said material outlet opening without interruption of the operation of said extrusion press, said changer mechanism including a support member which is circular arc-shaped and which has a respective receiving portion for each of said displaceable one and said replacement element whereby said displaceable one and said replacement element are alternately positioned by a movement of said support member between an operating position in front of said material outlet and a non-operating position, and when in the non-operating position said displaceable one and said replacement element are removable, and a pivot pin to which said support member is mounted for pivoting movement about a pivot axis perpendicular to said central outlet axis; and a moving means for moving said support member pivotally about said pivot pin to move said displaceable one and said replacement element alternately between the operating and non-operating positions simultaneously.

2. An extrusion machine as claimed in claim 1, wherein said pin is mounted to the extrusion press.

3. An extrusion machine as claimed in claim 1, wherein the pivot pin is vertically directed, and the support member is thus pivotable in a horizontal plane with a circular motion.

4. An extrusion machine as claimed in claim 2, wherein a frame located in a central area of the extrusion press mounts the support member to said pin.

5. An extrusion machine as claimed in claim 1, wherein a material discharge shaft is associated with the die.

6. An extrusion machine as claimed in claim 5, wherein the material discharge shaft is positioned downwards at a right angle to the central outlet axis and further includes one of a cutting drive and a cutting tool therein.

7. An extrusion machine as claimed in claim 5, wherein the material discharge shaft is pivotably mounted to the support member.

8. An extrusion machine as claimed in claim 1, wherein the drive means of the support member is constituted by a double-acting cylinder arrangement.

9. An extrusion machine as claimed in claim 8, wherein the support member includes a chain connected to the drive means.

10. An extrusion machine as claimed in claim 8, wherein the support member includes a slider swing mechanism which is connected to the drive means.

11. An extrusion machine as claimed in claim 1, wherein there are at least two of said replacement elements.

12. An extrusion machine as claimed in claim 1, wherein the cutting tool is formed by a knife arrangement mounted in rotary manner arranged on a side of the die remote from the extrusion press and which is subject to the action of a cutting drive.

* * * * *